US012640597B2

(12) United States Patent
Hufschmid et al.

(10) Patent No.: US 12,640,597 B2
(45) Date of Patent: May 26, 2026

(54) WIRELESS POWER TRANSFER

(71) Applicant: Georg Fischer Rohrleitungssysteme AG, Schaffhausen (CH)

(72) Inventors: Elmar Hufschmid, Albbruck (DE); Yuri Selvaggi, Zurich (CH); Reto Signer, Wetzikon (CH); Andy Bleuler, Zufikon (CH); Thomas Hartmann, Ravensburg (DE); Calin Ciobanu, Brea, CA (US)

(73) Assignee: GEORG FISCHER ROHRLEITUNGSSYSTEME AG, Schaffhausen (CH)

( * ) Notice: Subject to any disclaimer, the term of this patent is extended or adjusted under 35 U.S.C. 154(b) by 0 days.

(21) Appl. No.: 18/638,855

(22) Filed: Apr. 18, 2024

(65) Prior Publication Data

US 2024/0356385 A1　　Oct. 24, 2024

(30) Foreign Application Priority Data

Apr. 20, 2023　(EP) ..................................... 23168841
Aug. 2, 2023　(EP) ..................................... 23189230

(51) Int. Cl.
　　*H02J 50/80*　　　(2016.01)
　　*H02J 50/12*　　　(2016.01)
(52) U.S. Cl.
　　CPC ............. *H02J 50/80* (2016.02); *H02J 50/12* (2016.02)
(58) Field of Classification Search
　　CPC ................................. H02J 50/80; H02J 50/12
　　USPC ....................................................... 307/149
　　See application file for complete search history.

(56) References Cited

U.S. PATENT DOCUMENTS

| | | | |
|---|---|---|---|
| 8,497,658 B2 * | 7/2013 | Von Novak ............. | H02J 50/10 |
| | | | 320/108 |
| 8,629,650 B2 * | 1/2014 | Mohammadian ........ | H04B 5/48 |
| | | | 320/108 |
| 8,796,999 B2 * | 8/2014 | Toncich ................... | H02J 50/20 |
| | | | 320/155 |
| 8,878,393 B2 * | 11/2014 | Kirby ...................... | H02J 50/70 |
| | | | 307/104 |
| 9,130,394 B2 * | 9/2015 | Burdo ...................... | H02J 50/12 |

(Continued)

FOREIGN PATENT DOCUMENTS

EP　　　　2870677 B1　　9/2018

*Primary Examiner* — Alfonso Perez Borroto
(74) *Attorney, Agent, or Firm* — LEYDIG, VOIT & MAYER, LTD.

(57) ABSTRACT

A method for optimized wireless power transfer between two coils by transferring power of a coil of a primary side to a coil on a secondary side, the method including determining a common resonant frequency of the primary and secondary sides by measuring a power consumption of the secondary side, transmitting the measured power consumption to the primary side, and ascertaining and shifting a resonant frequency on the primary side for an improved common resonant frequency based on the measured and transmitted power consumption, or based on a highest efficiency of a power transfer between the coil of the primary side and the coil of the secondary side. The measuring and transmitting of the measured power consumption and the ascertaining and shifting of the resonant frequency forms a repeating process and as a result the resonant frequency of the primary side is continuously adjusted and improved.

6 Claims, 2 Drawing Sheets

(56)     References Cited

U.S. PATENT DOCUMENTS

| | | | |
|---|---|---|---|
| 2011/0053500 A1* | 3/2011 | Menegoli ................. | H04B 5/79 |
| | | | 455/41.1 |
| 2011/0101790 A1 | 5/2011 | Budgett | |
| 2016/0164303 A1 | 6/2016 | Ku et al. | |

* cited by examiner

WIRELESS POWER TRANSFER

CROSS REFERENCE TO RELATED APPLICATIONS

This application claims benefit to European Patent Application No. EP 23 168 841.7, filed on Apr. 20, 2023, and European Patent Application No. EP 23 189 230.8, filed on Aug. 2, 2023, which are hereby incorporated by reference herein.

FIELD

The invention relates to a method for optimized wireless power transfer between two coils by transferring power of a coil of a primary side to a coil on a secondary side.

BACKGROUND

The efficiency of the power transfer in inductive power transfer from the primary side to the secondary side is significantly increased by operation at the resonant frequency. The resonant frequency, at which the highest efficiency of the power transfer is achieved, is determined by the components of the primary and secondary sides. Factors which affect the components and which thus also influence the resonant frequency and constantly change, which amongst other things are aging, the temperature, the quality of the components and the transmissibility or the dielectric conductivity due to dust or dirt, likewise need to be taken into consideration.

SUMMARY

In an embodiment, the present disclosure provides a method for optimized wireless power transfer between two coils by transferring power of a coil of a primary side to a coil on a secondary side, the method comprising determining a common resonant frequency of the primary and secondary sides by measuring a power consumption of the secondary side, transmitting the measured power consumption of the secondary side to the primary side, and ascertaining and shifting a resonant frequency on the primary side for an improved common resonant frequency based on the measured power consumption of the secondary side transmitted to the primary side, or based on a highest efficiency of a power transfer between the coil of the primary side and the coil of the secondary side. The measuring and transmitting of the measured power consumption and the ascertaining and shifting of the resonant frequency of the primary side forms a repeating process and as a result the resonant frequency of the primary side is continuously adjusted and improved.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
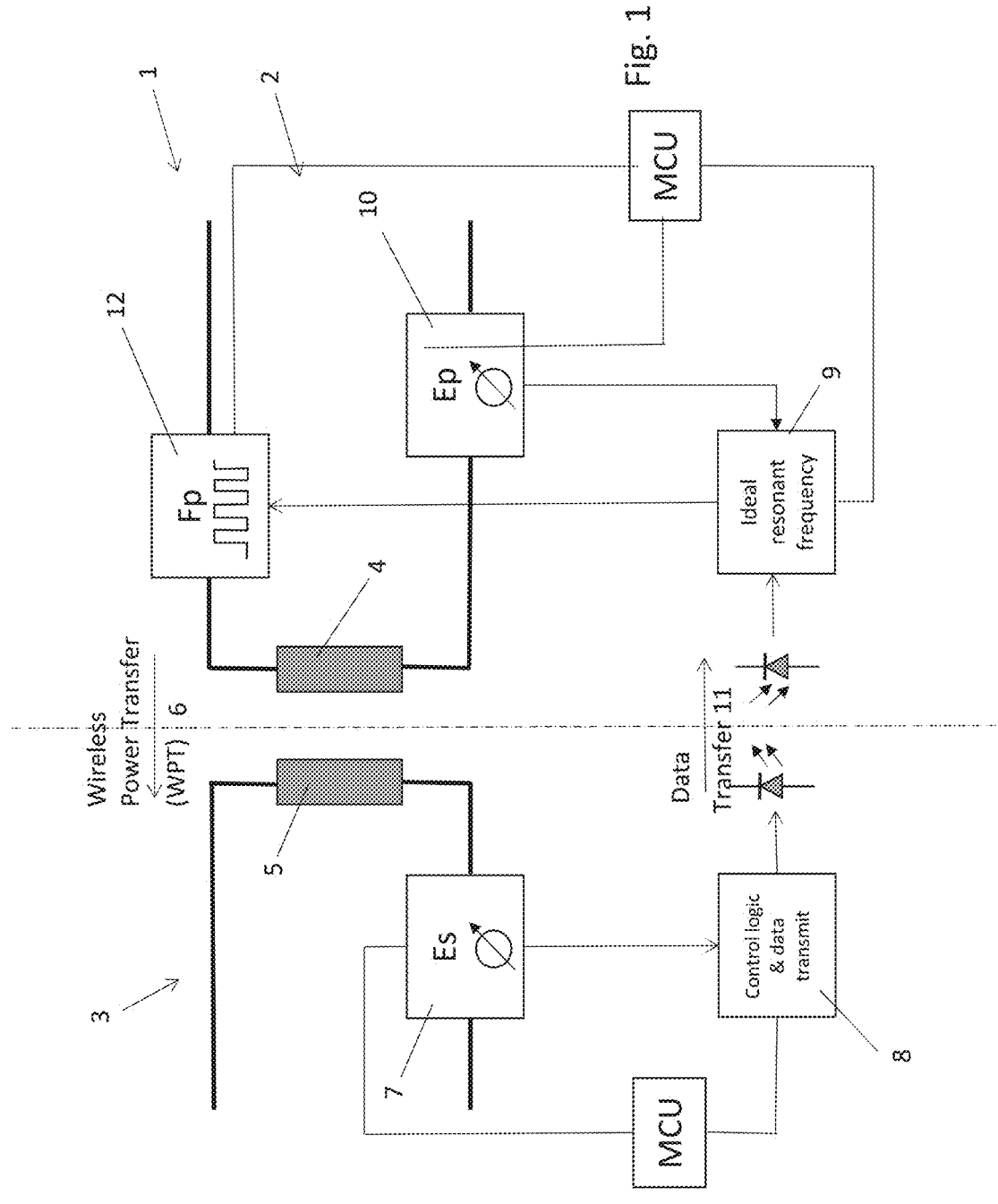
FIG. 1 illustrates a scheme for a method according to an embodiment of the invention in which the power measurement of the secondary side is transferred to the primary side.

In an embodiment, the invention provides a method in which the constantly changing resonant frequency of the coils is dynamically and continuously ascertained and adjusted in order to always achieve the best possible efficiency for the power transfer from the primary side to the secondary side.

In an embodiment, a common resonant frequency of the primary and secondary sides is determined by:
  measuring the power consumption of the secondary side,
  transmitting the measured values of the power consumption of the secondary side to the primary side, and
  ascertaining and shifting the resonant frequency on the primary side for an improved or optimized common resonant frequency on the basis of the measured values of the power consumption transmitted to the primary side, or on the basis of the presently highest efficiency for the power transfer between the primary and secondary coils,
  wherein the measuring and transmitting of the measured values of the power consumption and the ascertaining and shifting of the resonant frequency of the primary side forms a constantly repeating process and as a result the resonant frequency of the primary side is continuously adjusted and improved.

In an embodiment, the secondary side is automatically matched to the primary side by:
  ascertaining and determining an optimal resonant frequency of the primary side by
  measuring the power consumption of the primary side at different frequencies,
  shifting the resonant frequency of the primary side to that frequency at which the maximum load or power consumption is measured,
  wherein the ascertaining and determining of an optimal resonant frequency and the shifting of the resonant frequency forms a constantly repeating process and as a result the resonant frequency of the primary side is continuously adjusted and improved,
  measuring the power consumption of the secondary side, and
  matching the resonant frequency of the secondary side to the resonant frequency of the primary side by means of a secondary-side matching process, wherein the secondary-side resonant circuit is adapted or adjusted to match the resonant frequency of the primary side.

The method according to an embodiment of the invention for optimized wireless power transfer between two coils by transferring power of a coil of a primary side to a coil on a secondary side contains the following steps: In order to obtain a best possible or highest possible efficiency during the power transfer, a common resonant frequency of the primary and secondary sides is determined. This is achieved by measuring the power consumption of the primary and secondary sides at different frequencies, preferably by means of a current and voltage measurement. Preferably, during the power measurement, the power as an average or root mean square value and/or the power peaks are acquired.

The acquired measured values of the power consumption of the secondary side are transmitted to the primary side.

The resonant frequency on the primary side is ascertained and shifted for an improved common resonant frequency on the basis of the transmitted measured values of the power consumptions on the primary and secondary sides or the power consumption of the secondary side. Preferably, this is ascertained by an MCU (Micro Control Unit).

Preferably, in order to ascertain the optimal common resonant frequency of the primary and secondary coils, the frequency at which the power transfer between the two coils is the most efficient or has the highest efficiency is ascertained, this being performed on the basis of the measured values of the primary and secondary coils.

Alternatively, the frequency of the primary coil can be shifted to the frequency corresponding to the measurement of the power consumption of the secondary side, which frequency is then used as the common resonant frequency for optimal power transfer.

The measuring and transmitting of the measured values of the power consumptions and the ascertaining and shifting of the resonant frequency of the primary side on the basis of the transmitted measured values of the secondary side or of the primary and secondary sides is a repeating process, as a result of which the resonant frequency of the primary side is continuously adjusted and improved.

The method according to an embodiment of the invention for optimized wireless power transfer between two coils by transferring power of a coil of a primary side to a coil on a secondary side contains the following steps: ascertaining and determining an optimal resonant frequency of the primary side by measuring the power consumption of the primary side at different frequencies. Subsequently, the resonant frequency of the primary side is shifted to that frequency of the measured different frequencies at which the maximum load is measured. Wherein the ascertaining and determining of an optimal resonant frequency and the shifting of the resonant frequency is a repeating process and as a result the resonant frequency of the primary side is continuously adjusted and improved. In addition, the power consumption of the secondary side is measured in relation to the frequency. In order to obtain a best possible efficiency, the resonant frequency of the secondary side is matched to the resonant frequency of the primary side by means of a secondary-side matching process. For this purpose, the secondary-side resonant circuit is influenced or adjusted on the basis of the resonant frequency of the primary side.

An embodiment of the method comprises the transmitted measured values of the power consumption, preferably of the secondary side, being transmitted preferably to the primary side contactlessly via an independent interface that is separate from the coil. It is advantageous if the measured values of the power consumption of the secondary side in relation to the frequency are transmitted to the primary side via a separate independent interface. Preferably, the separate interface is designed for bidirectional data transfer. This also makes data transfer from the primary side to the secondary side possible and, where appropriate, measured values, settings, specifications and feedback can likewise be exchanged.

It has proven to be advantageous if the method according to an embodiment of the invention for wireless power transfer is used in coils for the operation of a sensor, actuator and/or controller. As a result, for example, a sensor can be easily connected to a probe or transmitter since wireless power and data transfer are made possible. Wireless power transfer which has a high efficiency is also quite useful in the field of actuators and controllers.

It is advantageous if, in order to ascertain the optimal resonant frequency for the power transfer, an MCU (Micro Control Unit) continuously switches to different frequencies and ascertains the loads in relation to the frequencies. This gives the frequency at which the highest load or power consumption is possible. Since the resonant frequency can continuously change, this ascertainment is likewise preferably performed continually or repeats itself. The resonant frequency can be ascertained on the primary side as well as on the secondary side.

It is advantageous if one MCU is arranged on the primary side and a further MCU is arranged on the secondary side, respectively, each MCU monitoring and controlling this respective side.

Preferably, in order to ascertain the optimal resonant frequency, an MCU is continuously switched to at least three different frequencies and this for each cycle for ascertaining a common resonant frequency. The power consumption of the coil is then ascertained at each of the frequencies, as a result of which the frequency at which the highest power consumption occurs is apparent.

It has proven to be advantageous if the frequency is shifted to that frequency at which a maximum load or power consumption is measured (resonant frequency). This ensures a high efficiency of the power transfer.

According to a preferred embodiment, the method switches between at least three different frequencies in order to ascertain the optimal resonant frequency. It has proven to be advantageous if the three different frequencies are formed by the present frequency, the present frequency plus a delta frequency change and the present frequency minus a delta frequency change.

It is advantageous if the value of the delta frequency change is equal for each ascertainment and, starting from the present frequency, one is offset as a negative value and one as a positive value.

Preferably, the delta of the frequency change is determined dynamically. That means that if the three frequencies having a first delta, which corresponds to a smallest possible delta, show no difference in the power consumption, the delta is increased and the resonant frequency is ascertained again. With each new ascertainment of the resonant frequency, the delta is reset to the smallest possible step. In this way, the range of the frequency change is dynamically adjusted to match the respective conditions, components at particular points in time and the factors which influence them. The derating can also have different speeds at different points in time, which e.g. in the case of a small delta display no change in power or in the case of a large delta cause an excessively rough adjustment. The above-mentioned way of choosing the range of the frequencies ensures that the smallest possible delta is always started with, as a result of which excessively rough adjustments of the frequency can be avoided.

It has proven to be advantageous if the secondary-side matching process is performed by an AFE (Analogue Front End) arranged on the secondary side and controlled by an MCU. This ensures that the resonant frequency on the secondary side can be matched to the primary-side resonant frequency. The secondary resonant circuit is adjusted to match the primary-side resonant frequency by way of elements which are arranged in the AFE and which are monitored and controlled by the MCU.

Preferably, an MCU controls a digitally adjustable resistor, a digitally adjustable capacitor, and/or analogue switches with resistors and/or capacitors of an AFE arranged on the secondary side. This ensures that the resonant circuit on the secondary side lies in the frequency range of the ascertained resonant frequency on the primary side.

All of the configuration options can be freely combined with one another.

The scheme illustrated in FIG. 1 shows the method according to an embodiment of the invention for optimized wireless power transfer between two coils 4, 5. Power is transferred 6 from the coil 4 of the primary side 2 to the coil 5 of the secondary side 3. In order to achieve as high an efficiency as possible during the power transfer 6, a common resonant frequency for transferring power between the two coils 4, 5 is determined. For this purpose, the power consumption 7 of the secondary side is acquired depending on the prevailing frequency. The acquired measured values 8 are then transmitted to the primary side 2. An optimal common resonant frequency is ascertained 9 on the primary side 2 using the frequencies ascertained from the primary side 2, the power consumption and the transmitted measured values 8 of the secondary side 3. Either by adjusting the primary side 2 on the basis of the measured values of the power consumption of the secondary side 3 or on the basis of the ascertained efficiency of the power transfer between the primary and secondary coils on the basis of the measured values of the primary and secondary sides.

This process is constantly repeated, as a result of which the common resonant frequency is continually adjusted since the optimal resonant frequency continuously changes due to the change in the components or the effect of the factors on the components. It is advantageous if the measured values of the power consumption 8 of the secondary side 3 are transmitted via an independently contactless data interface 11 which is separate from the coils 4, 5. Moreover, it has also proven to be advantageous, in order to ascertain the optimal resonant frequency, for an MCU to continuously switch 12, preferably between three frequencies on the primary side 2, and to ascertain from amongst these frequencies the frequency with the highest power consumption as the resonant frequency and respectively shift the resonant frequency to it. Wherein the measured values with regard to the power consumption 7 which are transmitted from the secondary side 3 influence the frequencies of the primary side 2.

Figure 2:
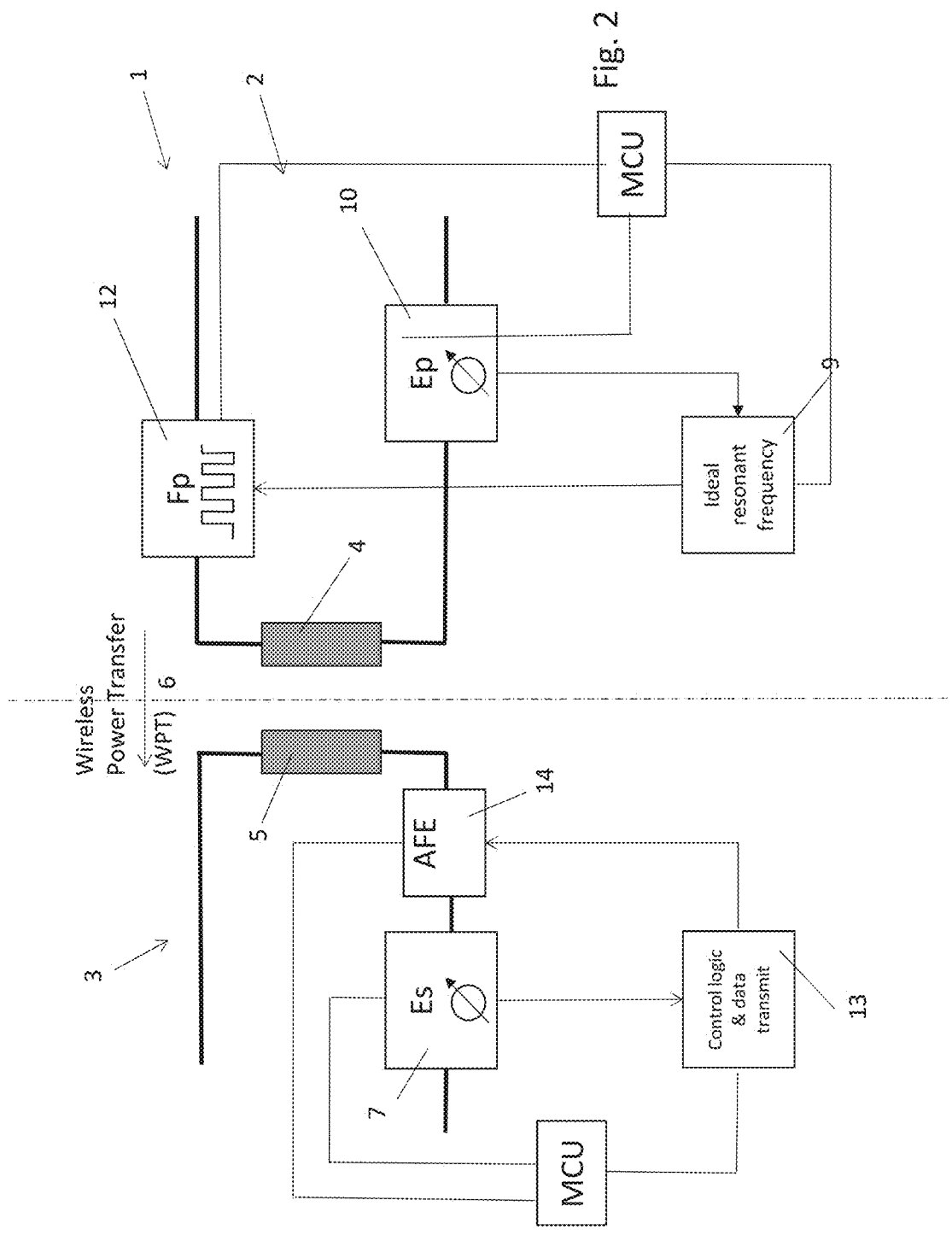
FIG. 2 illustrates a scheme for a method according to an embodiment of the invention in which the secondary side adjusts to match the resonant frequency of the primary side.

FIG. 2 shows a further scheme of the method according to an embodiment of the invention for optimized wireless power transfer between two coils 4, 5. Power is likewise transferred 6 from the coil 4 of the primary side 2 to the coil 5 of the secondary side 3. Here too, in order to achieve as high an efficiency as possible during the power transfer 6, a common resonant frequency for transferring power between the two coils 4, 5 is determined. In contrast to the method or scheme in FIG. 1 where the primary side 2 finds the optimal resonant frequency on the basis of feedback of the secondary side 3, in the further embodiment of the method illustrated in FIG. 2 the secondary side 3 is automatically matched to the primary side 2. For this purpose, the power consumption 10 on the primary side is measured, preferably at three different frequencies, whereupon the resonant frequency is shifted to the frequency with the highest power consumption. Power is measured 7 on the secondary side 3. Thereupon a matching process 13 is used to perform matching of the resonant frequency of the secondary side 3, wherein the resonant circuit of the secondary side 3 is adjusted to match the resonant frequency of the primary side 2.

It is advantageous if an AFE (Analogue Front End) 14 is arranged on the secondary side 3, which AFE is controlled by an MCU and correspondingly controls the secondary resonant circuit or controls a digitally adjustable resistor, a digitally adjustable capacitor and/or an analogue switch with resistors and/or capacitors of an AFE. As a result, the secondary side is automatically adjusted to match the primary-side resonant frequency. Wherein, on the primary side as well as on the secondary side, the already mentioned method step of ascertaining the resonant frequency on the basis of the highest power consumption from at least three frequencies is performed.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Wireless Power Transfer (WPT) diagram
2 Primary side
3 Secondary side
4 Coil primary side
5 Coil secondary side
6 Power transfer
7 Measuring power consumption or load on the secondary side
8 Acquiring and transmitting the measured values
9 Ascertaining the optimal resonant frequency
10 Measuring power consumption or load on the primary side
11 Contactless interface/data transmission
12 Frequency monitoring
13 Matching process
14 AFE (Analogue Front End)

The invention claimed is:

1. A method for optimized wireless power transfer between two coils by transferring power of a coil of a primary side to a coil on a secondary side, the method comprising:

ascertaining and determining an optimal resonant frequency of the primary side by:

measuring a power consumption of the primary side at different frequencies, shifting the resonant frequency of the primary side to a frequency at which a maximum power consumption is measured, wherein the ascertaining and determining of the optimal resonant frequency and the shifting of the resonant frequency forms a repeating process and as a result the resonant frequency of the primary side is continuously adjusted and improved, measuring a power consumption of the secondary side, matching a resonant frequency of the secondary side to the resonant frequency of the primary side by a secondary-side matching process, wherein a secondary-side resonant circuit is adjusted to match the resonant frequency of the primary side.

2. The method according to claim 1, wherein in order to ascertain the optimal resonant frequency a Micro Control Unit (MCU) continuously switches to different frequencies and ascertains a load.

3. The method according to claim 1, wherein in order to ascertain the optimal resonant frequency a Micro Control Unit (MCU) continuously switches to at least three different frequencies.

4. The method according to claim 1, wherein in order to ascertain the optimal resonant frequency at least three different frequencies are switched between, and wherein the at least three different frequencies are formed by a present frequency, the present frequency plus a delta frequency change and the present frequency minus the delta frequency change.

5. The method according to claim 1, wherein the secondary-side matching process is performed by an Analogue Front End (AFE) arranged on the secondary side and controlled by a Micro Control Unit (MCU).

6. The method according to claim 1, wherein a Micro Control Unit (MCU) controls a digitally adjustable resistor, a digitally adjustable capacitor, and/or analogue switches with resistors and/or capacitors of an Analogue Front End (AFE).

* * * * *